United States Patent Office 2,758,012
Patented Aug. 7, 1956

2,758,012

TREATING OXIDIZED MANGANESE CARBONATE PRODUCTS

Jay Y. Welsh and Russell A. Holmes, Brainerd, Minn., assignors to Manganese Chemicals Corporation, Minneapolis, Minn., a corporation of Minnesota No Drawing. Application June 7, 1954,
Serial No. 435,080

6 Claims. (Cl. 23—145)

This invention relates to the production of manganese dioxide-containing depolarizing materials for use in primary cells, and is directed to a treatment of an oxidized manganese carbonate product produced by oxidizing in air a manganese carbonate derived by precipitation from a solution of an ammonio complex of manganese, whereby to increase the available oxygen content, and to improve the depolarizing properties, of the product. Use of the expression "available oxygen" is a conventional method of stating the percentage of $MnO_2$ or apparent $MnO_2$ present in a manganese-oxygen compound, the available oxygen as such being determined and then expressed as percent $MnO_2$.

The invention is particularly concerned with the improvement of such oxidized manganese carbonate products, of the above category, as initially contain from 50% to about 85% of available oxygen (i. e., contain oxygen corresponding to from 50% to about 85% $MnO_2$). The oxidized manganese carbonate product starting material is known to contain a major proportion of manganese dioxide, a minor proportion of lower oxides of manganese and a relatively very small amount of manganese carbonate. The same may be and preferably is the product produced in accordance with the roasting process disclosed in our application for U. S. Letters Patent Serial No. 430,433, filed May 17, 1954, entitled "Oxidizing Manganese Carbonate."

In our application for U. S. Letters Patent Serial No. 430,434, filed May 17, 1954, entitled "Manganese Dioxide Product," we had disclosed the concept of increasing the manganese dioxide content, and changing the crystal structure, of an oxidized manganese carbonate product of the above category by treating such product with an aqueous electrolyte at elevated temperature for some hours, separating the electrolyte from the oxidized manganese carbonate product, drying the latter, and heating it for some time at from about 175° to about 210° C.

It has now been found that the content of available oxygen of the aforesaid oxidized manganese carbonate product may be increased, by a simpler and less expensive two-step procedure, according to which in the first step the oxidized manganese carbonate product, initially containing in excess of 50% and up to about 85% of available oxygen, is exposed for some hours to an atmosphere in equilibrium with water from 190° to 200° F., e. g., at 195° F., and in the second step the so-treated material is heated, in air, for some time at a temperature of from about 250° to about 400° F. to further the oxidation as much as possible.

Effecting the re-roasting at a lower temperature, e. g., 400° F. versus 550° F., not only reduces the cost of the heating but has the further advantage that the product exhibits improved depolarizing properties.

In carrying out the procedure of the present invention it has been observed that the product of the first step thereof shows an X-ray pattern indicating that in the product there has been formed an intermediate hydrate which hydrate possibly might be represented by the formula $Mn_2(OH)_2CO_3$ (postulated). It appears that such intermediate hydrate is formed from a component of said product other than the manganese dioxide itself, which intermediate hydrate upon further heating in air is converted into a further amount of manganese dioxide. Regardless of theory, the process of the present invention has proved effective for increasing the available oxygen content of the aforesaid oxidized manganese carbonate product.

The complete process, according to the invention, involves subjecting a manganese carbonate precipitate, derived from a solution of an ammonio complex of manganese, to heating for some hours, e. g., 6 to 24 hours, in an atmosphere containing water vapor and a substantial content—from about 3 to about 10%—of carbon dioxide, at a temperature of from about 500° to about 550° F., whereby there is produced an oxidized manganese carbonate product containing from about 70% to as much as 85% available oxygen; thereafter exposing the so-oxidized material to air in equilibrium with water at 190°–200° F. for 2 to 8 hours; and subjecting the so-treated material to heating for some hours, e. g., 4 to 6 hours, at a temperature of from about 250° to about 400° F., in air containing water vapor and a controlled concentration, e. g., up to 10%, of carbon dioxide to further the oxidation of the product to $MnO_2$.

Optionally, we may after-treat the re-roasted product, above, by exposing the same for a brief period to air in equilibrium with water at about 190–200° F., whereby to leave in the product a small amount of chemically combined water and thus still further improve its depolarizing properties.

Specific example

The starting material was a manganese carbonate precipitate which had been roasted for about 24 hours at about 550° F. in air containing water vapor and approximately 10% of $CO_2$: the same contained 83.3% available oxygen.

A sample, approximately 0.1 kg., of this starting material was spread on a glass plate, and placed in the upper part of a desiccator containing water in its lower part, and the desiccator and contents were placed in an oven maintained at 195° F. where the same remained for about 16 hours (over night). The so-treated sample was then roasted for 3 hours at 400° F. in air containing water vapor and about 10% $CO_2$. Upon cooling, the resulting re-roasted material was analyzed and found to have a content of available oxygen amounting to 87.3%, i. e., an increase of 4% of available oxygen.

We claim:

1. In the process of oxidizing precipitated manganese carbonate to a manganese dioxide-containing product having depolarizing properties involving the step of heating the carbonate for at least 6 hours, in air containing water vapor and from about 3 to about 10% of carbon dioxide, at a temperature of from about 500° to about 550° F, thereby producing an oxidized product containing in excess of 50% and up to about 85% of available oxygen, the improvement which consists in exposing said oxidized product for at least 2 hours to an atmosphere of air in equilibrium with water at a temperature of from about 190° to about 200° F, and heating the so-treated product in air for at least 3 hours at a temperature of from about 250° to about 400° F.

2. In the process of oxidizing precipitated manganese carbonate to a manganese-dioxide-containing product having depolarizing properties involving the step of heating the carbonate for at least 6 hours, in air containing water vapor and from about 3 to about 10% of carbon dioxide, at a temperature of from about 500° to about 550° F., thereby producing an oxidized product containing in excess of 50% and up to about 85% of available oxygen, the improvement which consists in exposing said oxidized product for at least 2 hours to an atmosphere of air in equilibrium with water at a temperature of from about 190° to about 200° F., and heating the so-treated product in air containing water vapor and up to 10% of carbon dioxide for at least 3 hours at a temperature of from about 250° to about 400° F.

3. Process of further oxidizing a partially oxidized manganese carbonate product containing in excess of 50% and up to about 85% of available oxygen, which comprises exposing the same for at least 2 hours in an atmosphere of air in equilibrium with water at a temperature of from about 190° to about 200° F. and then heating the so-treated product in air for from about 3 to about 6 hours at a temperature of from about 250° to about 400° F.

4. Process of converting a precipitated manganese carbonate into a battery grade manganese dioxide product, which comprises heating the carbonate for at least 6 hours in air containing water vapor and approximately 10% of carbon dioxide at a temperature of from about 480° to about 575° F. thereby producing a roasted product having an available oxygen content exceeding 50% and up to about 85%, exposing the roasted product for at least 2 hours to an atmosphere of air in equilibrium with water at a temperature of from about 190° to about 200° F., and re-roasting the so-treated product in air for at least 3 hours at a temperature of from about 250° to about 400° F.

5. Process as defined in claim 4, in which the roasting of the carbonate is effected for 6 to 24 hours in air substantially saturated with water vapor, and in which the treated product is re-roasted for from about 3 to about 6 hours in air containing water vapor and carbon dioxide.

6. Process of converting precipitated manganese carbonate to an intermediate hydrate, which comprises heating the carbonate for from 6 to 24 hours in air containing water vapor and from about 3 to about 10% of carbon dioxide at a temperature of from about 500° to about 550° F. and thereafter exposing the resulting partial oxidation product for from 2 to 8 hours in an atmosphere of air in equilibrium with water at a temperature of from about 190° to about 200° F.

References Cited in the file of this patent

UNITED STATES PATENTS

| 1,275,666 | Ellis et al. | Aug. 13, 1918 |
| 2,608,466 | Fox | Aug. 26, 1952 |

FOREIGN PATENTS

| 311,271 | Great Britain | Jan. 23, 1930 |